W. A. BULLARD.
Lubricators for Car-Wheels.
No. 145,395. Patented Dec. 9, 1873.
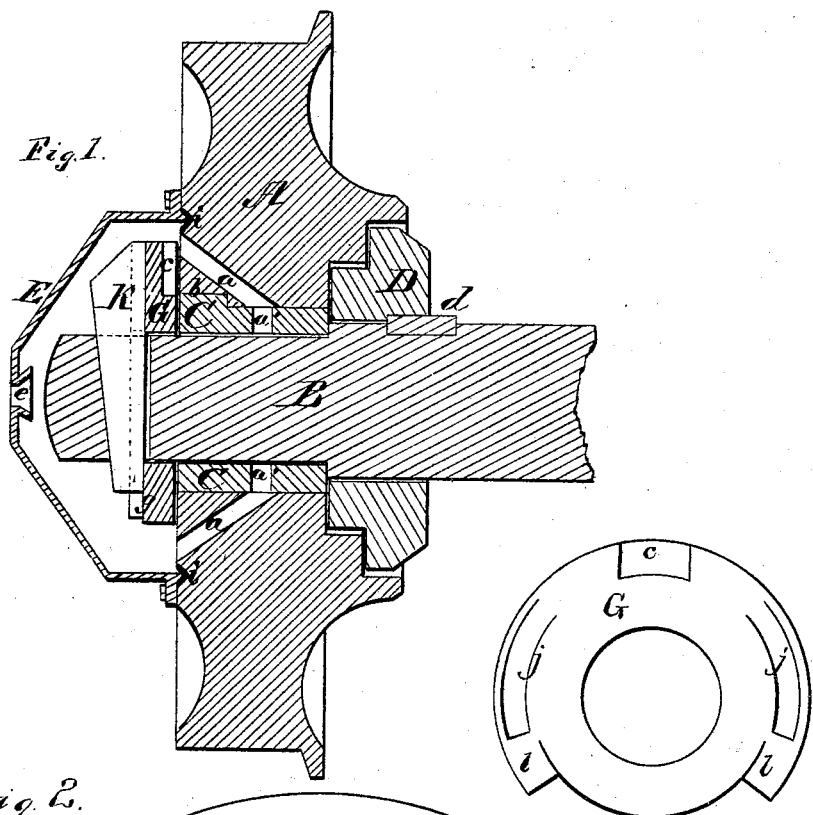
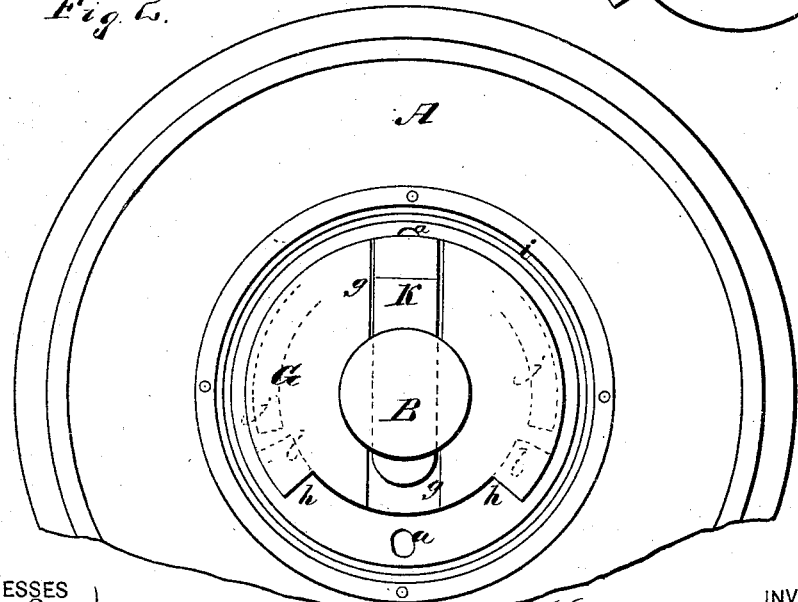
WITNESSES
E. A. Bates
George E. Upham
INVENTOR
William A. Bullard
By Chipman Osmer & Co
ATTORNEYS.

UNITED STATES PATENT OFFICE.

WILLIAM A. BULLARD, OF KALAMAZOO, MICHIGAN.

IMPROVEMENT IN LUBRICATORS FOR CAR-WHEELS.

Specification forming part of Letters Patent No. 145,395, dated December 9, 1873; application filed November 1, 1873.

*To all whom it may concern:*

Be it known that I, WILLIAM A. BULLARD, of Kalamazoo, in the county of Kalamazoo and State of Michigan, have invented a new and valuable Improvement in Car-Wheel Lubricators; and I do hereby declare that the following is a full, clear, and exact description of the construction and operation of the same, reference being had to the annexed drawings making a part of this specification, and to the letters and figures of reference marked thereon.

Figure 1 of the drawings is a representation of a sectional view of my car-wheel lubricator. Fig. 2 is a plan view of the same.

This invention relates to improved means for lubricating car-wheels which turn on their axles, and also for preventing the entrance of dust into the oil-chamber and to the parts lubricated. The nature of my invention consists in the application of an oil-cup with a funnel-shaped feed-hole to the outside of the car-wheel, so as to inclose the end of the axle, in combination with inclined passages leading through the hub of the wheel, and communicating with openings made through the box or bushing, and with a recessed washer, which is secured to the axle by a self-adjusting key, as will be hereinafter explained. The invention further consists in an inside closely-fitting washer, which is keyed to the axle, in combination with oil-supply passages leading into the eye of the wheel, and with an outside washer, which is recessed and keyed to the axle, and inclosed by an oil-cup fixed to the wheel, as will be hereinafter explained.

The following is a description of my improvements.

In the annexed drawings, A represents a railroad-car wheel, which is applied to an axle, B, so as to turn freely thereon. C represents a bushing for the eye of the wheel, which is rigidly secured in place by a tenon, *b*, fitting into a groove made in the wheel. A circular recess of two diameters is made into the inner side of the wheel A, concentric to its axis, into which recess a washer, D, is fitted, which is secured by a tenon, *d*, to the axle, and intended for keeping out dust, &c., and preventing the escape of oil from around the axle inside of the box or bushing C. E represents a cone-shaped oil-cup, which is secured centrally to the outside face of the wheel A, and tightly packed, by its beveled edge fitting into a V-shaped groove, *i*, in the wheel, and by means of leather, rubber, or other suitable material, applied into said groove. This oil-cup is supplied with oil through a central feed-hole, *e*, which is surrounded internally by a funnel for preventing the escape of oil through the opening. From this cup oil is supplied to the interior of the bushing C, at or near the middle of its length, through passages *a a*, which converge toward holes *a′ a′* made through the bushing. The passages *a a* are made into the wheel A, and are diametrically opposite each other, so that they register with the holes *a′ a′* once during each revolution of the wheel. G designates a washer, which is applied to the outside face of the wheel A, and connected to axle B by means of a wedge, K, the largest end of which is up. This wedge enters a groove made diametrically into the washer G, and passes through a slot through the axle G, which slot is of such size, relatively to the thickness of said washer, that, as the latter wears away, the wedge will descend and always keep the washer in close contact with the wheel. Below the axle B the washer has a segment, *h*, cut out of it, which leaves a space that terminates at its ends in beveled surfaces *l l*. These beveled surfaces *l l* terminate near the deepest ends of two concentric grooves *j j*, which vanish to nothing as they rise, and terminate before reaching the highest point of the washer. The segment-space *h*, terminating in beveled ends, allows the wheel A to carry up oil between it and the washer, for lubricating the same, and the grooves *g g* receive into them some of this oil, and arrest it, until carried off by the wheel A. At the highest point of the washer G a cup, *c*, is formed into it, for the purpose of retaining oil at this point, and supplying the inclined conduits therewith as they successively move past said cup *c*. Oil is supplied to this cup *c* by the revolution of the cup E.

It will be seen that oil is prevented escaping from the ends of the bushing C by the washers D G, one of which, G, serves as an oilfeeder, and that the spent oil is allowed to flow back into the cup E from the bushing through the passages $a\ a'$ below the axle.

What I claim as new, and desire to secure by Letters Patent, is—

1. The oil-supply cup E, having a feed-hole, $c$, centrally through it, and secured to the outside of wheel A, in combination with inclined oil-passages $a\ a$ in the wheel A, and the holes $a'\ a'$ through the bushing C, and the recessed oil-supply washer G, applied to the axle B, substantially as described.

2. The washer D, keyed on axle B, and fitted in recesses in the wheel A, in combination with washer G, also keyed on axle B, and having a feed-cup, $c\ a$, feed-spaces $h$, and grooves $g\ g$, substantially as described.

In testimony that I claim the above I have hereunto subscribed my name in the presence of two witnesses.

WILLIAM ASHLEY BULLARD.

Witnesses:
  GEO. THOS. CLARK,
  Z. H. BULLARD.